United States Patent [19]

Jacobson et al.

[11] 4,418,888
[45] Dec. 6, 1983

[54] ANGLE COCK VALVE

[75] Inventors: Irvin D. Jacobson, Bratenahl; Frank R. Volgstadt, Madison; David P. Passerell, Geneva, all of Ohio

[73] Assignee: Perfection Corporation, Madison, Ohio

[21] Appl. No.: 271,281

[22] Filed: Jun. 8, 1981

[51] Int. Cl.³ .............................................. F16K 31/44
[52] U.S. Cl. .................................... 251/216; 251/284; 137/315
[58] Field of Search ..................... 251/357, 216, 284; 137/315

[56] References Cited

U.S. PATENT DOCUMENTS

| | | | |
|---|---|---|---|
| 1,267,763 | 5/1918 | Grikscheit | 251/284 |
| 2,525,928 | 10/1950 | McRae | 251/284 |
| 3,145,733 | 8/1964 | Shaw et al. | 251/357 |
| 3,323,546 | 6/1967 | Lord | 251/284 |
| 3,472,427 | 10/1969 | Schaefer | 251/284 |
| 4,109,672 | 8/1978 | Szemeredi | 137/315 |

FOREIGN PATENT DOCUMENTS

| | | | |
|---|---|---|---|
| 596568 | 4/1960 | Canada | 251/216 |
| 617438 | 3/1961 | Canada | 251/216 |

Primary Examiner—A. Michael Chambers
Attorney, Agent, or Firm—Fay & Sharpe

[57] ABSTRACT

The angle cock valve has all plastic parts to prevent galvanic corrosion when used in hot water tanks and the like. The valve includes a valve body, a valve stem and a stem retainer. The valve body has an inlet bore, an outlet bore, and a valve stem receiving bore disposed in fluid communication with each other. The inlet and valve stem receiving bores taken together form a linear bore for allowing a rod to pass into the water tank to dislodge accumulated sediment. An annular seat is disposed between the inlet and outlet bores. The valve stem has an enlarged handle portion at one end and a detent for mounting a seat seal at the other end. The valve stem and the stem receiving bore are threaded to enable the seat seal to be selectively moved longitudinally against the annular seat. A pair of annular ridges receive an annular seal. Facing the handle portion, the ridges have a generally transverse surface. The stem retainer is mounted on the exterior of the valve body. It has a projection which extends through an aperture into the valve stem receiving bore for selectively engaging the transverse surface to limit longitudinal movement of the valve stem. A spring segment resiliently urges the projection into the aperture. A grip portion enables the spring segment to be flexed and the projection withdrawn from the aperture. When the projection is withdrawn, the valve stem may be removed from the valve stem receiving bore.

16 Claims, 5 Drawing Figures

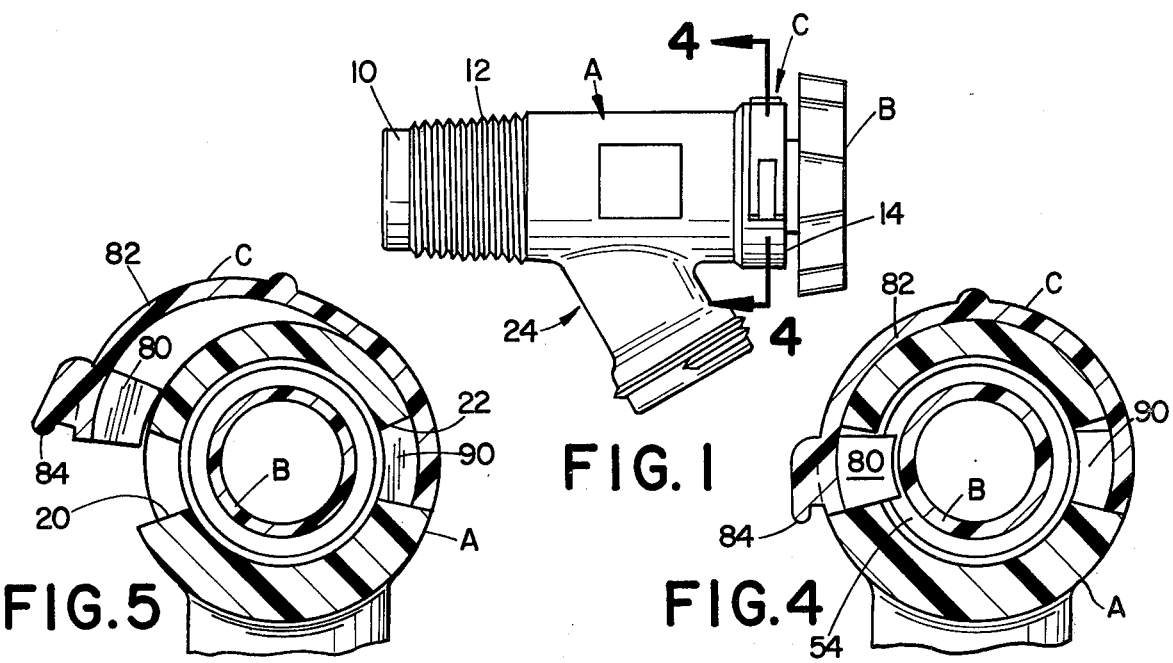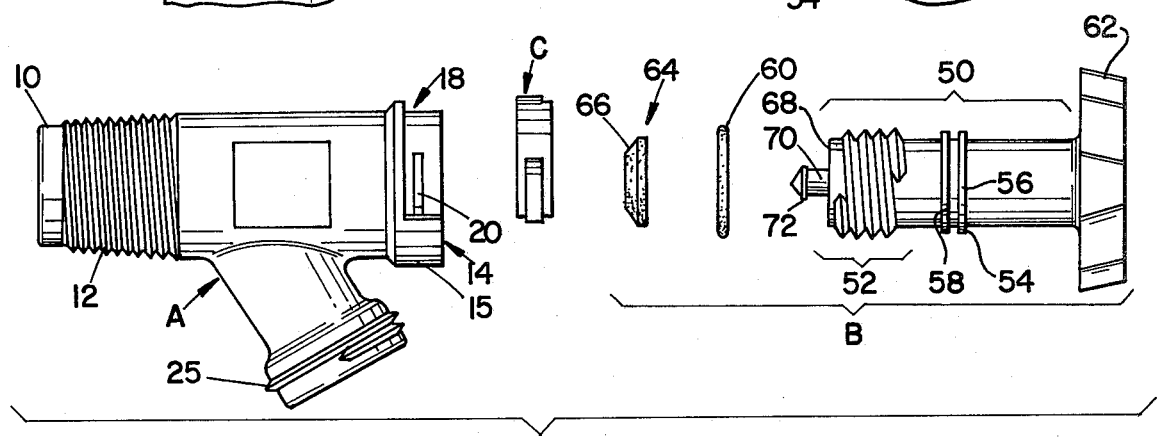

ANGLE COCK VALVE

BACKGROUND OF THE INVENTION

This application pertains to the art of valves and spigots and, more particularly, to drain valves. The invention is particularly applicable to drain valves for hot water heaters and will be described with particular reference thereto. It will be appreciated, however, that the invention has other applications such as sillcocks, spigots, other drain valves, and the like.

Hot water heaters conventionally have an iron or steel water tank with an inner glaze or lining. Near the bottom, the tank has an internally threaded metallic female fitting for receiving a drain valve. The drain valves must be strong and leak resistant even at the elevated temperatures associated with the hot water tank, generally on the order of 140° F. or more. Many homeowners use the drain valves only after long intervals, such as a year or two, to drain sediment from the tank. When drain valves remain closed for long periods, sufficient sediment may accumulate in the tank to clog the inlet to the drain valve. Sediment clogs are most easily broken up in drain valves which are designed such that a rod or snake can pass into the clog without removing the valve.

Other homeowners use the drain valve of their hot water tank frequently as a source of hot water. A hot water tank drain valve must be reliable whether used frequently or infrequently and when subject to relatively high temperatures and should readily receive rods for dislodging accumulated sediment.

Heretofore, drain valves have had a linear central bore with an outlet through the center of the handle. A commonly used drain valve of this configuration is illustrated in U.S. Pat. No. 3,181,555, issued May 4, 1965 to I. D. Jacobson. When using such valves, the homeowner risks discharging hot water through the handle into his hand.

Conventional sillcocks and other valves have also been used as drain valves on hot water tanks but have several drawbacks. When brass or copper valves are connected with the steel water tank, a galvanic interaction occurs causing corrosion and eventual failure. Another drawback to conventional sillcocks is that they inhibit the introduction of a rod or shank for dislodging sediment blockages. Removing the valve stem to provide a rod or snake receiving path is somewhat complex and introduction of a rod or snake is virtually impossible. Generally, it involves removing the handle from the valve stem, the bonnet from the valve body, and then removing the valve stem. Removing the bonnet risks interfering with the packing or seal between the bonnet and valve stem. Further, even after removing the valve stem, many valves present nonlinear or event tortuous paths which do not readily accept a rod or snake. Exemplary sillcocks are illustrated in U.S. Pat. No. 3,386,700, issued June 4, 1968 to G. Z. Greene et al. and U.S. Pat. No. 4,022,243, issued May 10, 1977 to R. B. Edwards. Valves have also been suggested in which the bonnet or other stem retainer is readily removable, note for example, U.S. Pat. No. 4,064,900, issued Dec. 7, 1977 to W. C. Schmitt and U.S. Pat. No. 1,518,307, issued Dec. 9, 1924 to G. W. Cooke.

The present invention contemplates a new and improved drain valve which overcomes all of the above-referenced problems and others. It provides a drain valve which is economical to manufacture, highly reliable whether used frequently or infrequently, and provides ready access through the valve for loosening sedimentation. Further, the valve of this invention eliminates the possibility of galvanic corrosion due to its non-metallic construction.

SUMMARY OF THE INVENTION

In accordance with the present invention, there is provided a valve which comprises a valve body, a valve stem, and a stem retainer. The valve body has an inlet bore, an outlet bore, and a valve stem receiving bore in communication with each other. An annular seat seal is disposed in the valve body between the inlet and outlet bores and substantially transverse to the stem receiving bore. The valve stem is disposed in the valve stem receiving bore for limited longitudinal movement between an annular seat to permit the flow of fluids between the inlet and outlet bores. The valve stem has a generally transverse surface disposed along its circumference. The valve stem retainer, mounted on the valve body, selectively engages the transverse surface to limit the longitudinal movement of the valve stem. The retainer comprises a spring segment for urging a projection through an aperture in the valve body and into the stem receiving bore such that the projection selectively engages the transverse surface of the valve stem.

A principal advantage of the present invention is that it is highly reliable whether used frequently or infrequently even though it has a simple construction and is inexpensive to manufacture.

Another advantage of the present invention is that it provides for easy dislodging of sedimentation clogs adjacent the drain valve. It provides an easily released valve stem retainer for selectively allowing the valve stem to be removed.

BRIEF DESCRIPTION OF THE DRAWINGS

The invention may take form in various parts and arrangements of parts. The drawings, which provide a detailed illustration of a preferred embodiment of the invention, should not be construed as limiting the invention.

FIG. 1 is a plan view of a drain valve in accordance with the present invention;

FIG. 2 is an exploded plan view of the drain valve of FIG. 1;

FIG. 3 is a longitudinal section through the valve of FIG. 1;

FIG. 4 is a transverse section along section line 4—4 of FIG. 1 with the stem retainer in its retaining position; and FIG. 5 is a transverse section along section line 4—4 of FIG. 1 with the stem retainer in its non-retaining position.

DESCRIPTION OF THE PREFERRED EMBODIMENT

The FIGURES show a drain valve which comprises a valve body A, a valve stem B, and a valve stem retainer C. The valve body A has a first or inlet end 10 which has external threads 12 to be threadingly received in a female fitting of a hot water tank. The valve body has a second or valve stem receiving end 14 which receives the valve stem B. Adjacent the second end is a circumferential collar 15 which has a recessed area 18 therein. The recessed area 18 extends partially around the circumference of the valve body and is adapted to receive the stem retainer C. Oppositely disposed through the recessed area are a pair of apertures 20 and 22 for receiving the stem retainer C. The interaction of these apertures and the stem retainer is explained in greater detail below. The valve body further includes an outlet spout 24 which has threads 25 for interconnection with a garden hose or the like. The valve body is integrally molded of a high density, impact resistant thermoplastic to eliminate galvanic interaction with the water heater or copper plumbing.

With particular reference to FIG. 3, in the interior of the valve body is an inlet bore 30 which extends from the first end 10 to a valve seat assembly 32. A valve stem receiving bore 34 extends from the valve seat assembly 32 to the second end 14 of the valve body. Taken together, the inlet bore 30 and the valve stem receiving bore 34 comprise a linear bore which extends between the first and second ends of the valve body. The linear bore allows a straight rod to be inserted from the second end of the valve body through the first end into the water tank to dislodge sedimentation. An outlet bore 36 (which is in fluid communication with the inlet bore 30 and the valve stem bore 34) extends through the outlet spout 24.

The valve seat assembly 32 is disposed between the inlet bore 30 and the outlet bore 36 for selectively permitting and prohibiting the flow of water therebetween. The assembly includes an annular valve seat 40 which is disposed transverse to the valve stem bore and is beveled to improve its sealing engagement with the valve stem. Between the annular seat 40 and the second end 14 the valve body defines portion 42 and a smooth, cylindrical portion 44. For compactness, the internally threaded portion 42 is disposed adjacent the annular seat 40 and the outlet bore 36 extends through the threaded portion. Although the cylindrical portion 44 is disposed closer than the internally threaded portion 42 to the second end 14, it will be appreciated that this relationship may be reversed.

With particular reference to FIG. 2, the valve stem B has a cylindrical section 50 for extending into the valve stem receiving bore 34. The cylindrical section 50 includes an externally threaded portion 52 for engaging the internally threaded portion 42 of the valve body. Rotation of the valve stem causes the valve stem to move longitudinally in the valve stem receiving bore 34. Also mounted on the generally cylindrical section 50 is a generally transverse surface 54 for engaging the stem retainer C. In the preferred embodiment, the generally transverse surface 54 is one surface of an annular ridge 56 extending completely around the circumference of the cylindrical section 50. The annular ridge 56 together with a second annular ridge 58 form an annular seal mounting means for receiving an annular seal which as an O-ring 60. The O-ring 60 engages the smooth cylindrical surface 44 and the cylindrical section 50 to provide a fluid seal to inhibit fluid from flowing through the stem receiving bore 34.

At one end, the valve stem B has an integral, enlarged handle portion 62. At its other end, the valve stem B has a seat seal mounting means for releasably mounting a seat seal 64. The seat seal 64 has a beveled, annular surface 66 for selectively engaging the annular seat 40 in a fluid sealing relationship with longitudinal movement of the valve stem in the valve stem receiving bore. The seat seal mounting means includes a generally flat annular support wall 68 which is normal to the axis of annular seat 40 for supporting the seat seal 64. The seat seal mounting means also includes a detent 70 which passes through a central aperture in the seat seal 64 for frictionally engaging and retaining it. The detent has an enlargement 72 at one end for increasing the frictional engagement with the seat seal. In the preferred embodiment, the valve stem, except for the seat seal and the O-ring, is integrally molded of thermoplastic material. The seat seal 64 and O-ring 60 are separately formed of synthetic rubber, e.g., neoprene, for greater pliability and flexibility. Alternately, the seat seal and the annular seal may be molded integrally with the rest of the valve stem.

With particular reference to FIGS. 4 and 5, the stem retainer C includes a projection or locking ear 80 which projects through the aperture 20 in the valve body for engaging the generally transverse surface 54. When the projection engages transverse surface 54, further outward longitudinal movement of the valve stem B in bore 34 is prohibited. Hence, non-intentional removal of the valve stem from the valve body is prevented. A spring section 82 resiliently urges the projection 80 through aperture 20. A gripping portion 84 enables the spring to be flexed and the projection 80 withdrawn or retracted from the stem receiving bore 34 without removal of the stem retainer C. The geometry of the projection and spring section provide a stable configuration, note FIG. 5, in which the bottom surface of the projection engages the exterior of the valve body when released. This enables the stem retainer to be disabled and permits the valve stem to be removed from the valve body without complete removal and disassembly of the stem retainer. By pressing on the spring segment 82 adjacent the portion 84, the projection may be snapped again into aperture 20 and returned to its retaining position illustrated in FIG. 4.

A releasable connecting means releasably connects the stem retainer C with the valve body. The releasable connecting means comprises a second projection or ear 90 which is received in aperture 22 of the valve body. The spring segment 82 is a generally circular arc segment extending transverse to the stem retaining bore 34. Specifically, the stem retainer C extends circumferentially over an arc segment of greater than 180°. It has a thickness which is commensurate with the depth of recess 18 such that its exterior surface is generally flush with flange 16. Alternately, the spring segment may be disposed longitudinally, parallel to the axis of the stem receiving bore 34. As yet another alternative, the projection may be held in aperture 20 by frictional engagement between the projection and the aperture instead of by the resilient urging of the spring segment. The transverse surface engaged by the projection may be a part of the annular seal or O-ring, a surface of threads 52, or the like.

The present invention has been described with reference to the preferred embodiment. Obviously, modifications and alterations will occur to others upon reading and understanding this specification. It is out intention to include all such modifications and alterations insofar as they come within the scope of the appended claims or the equivalent thereof.

Having thus described a preferred embodiment of our invention, we now claim our invention to be:

1. A drain valve comprising:
   a valve body having an externally threaded first end which is adapted to be threadingly received in a female fitting, a second end opposite the first end, a linear bore extending linearly through the valve body from the first end to the second end, an annular seat disposed in said linear bore mediate the first and second ends, an internally threaded portion disposed in said linear bore mediate the annular seat and the second end, a smooth, cylindrical portion in said linear bore mediate the annular seat and the second end, and an outlet spout having an internal outlet bore which is connected with said linear bore;

a valve stem having an enlarged handle portion and a cylindrical section dimensioned to be received in said linear bore from the second end, a seat seal mounting means disposed on the cylindrical section for mounting a seat seal, an externally threaded portion on the cylindrical section for engaging the internally threaded portion of said linear bore such that rotation of the valve stem relative to the valve body moves the seat seat in and out of fluid flow sealing engagement with said annular seat, and an annular seal for engaging the cylindrical section of said valve stem and said cylindrical portion of said linear bore in a fluid sealing relationship; and a stem retainer received on the valve body for releasably retaining the stem in said linear bore, said stem retainer including a projection adapted to extend through an aperture in the valve body and biasing means for resiliently biasing the projection into said valve body aperture, said projection being adapted to cooperate with an adjacent portion of the valve body when the projection is removed from the aperture for maintaining the stem retainer in a stable disabled condition while the stem retainer remains associated with the valve body.

2. The drain valve as set forth in claim 1, wherein said cylindrical portion is disposed mediate said internally threaded portion and said second end and said annular seal is disposed mediate the externally threaded portion and the enlarged handle portion of the stem.

3. The drain valve as set forth in claim 2 wherein said outlet bore is connected with said linear bore through said internally threaded portion.

4. The drain valve as set forth in claim 1 wherein said seat seal mounting means comprises a generally flat support wall disposed normal to the axis of said annular seat, a detent projecting normal from said flat support wall and an enlargement on said detent such that said seat seal is frictionally received on said detent.

5. The drain valve as set forth in claim 1 further comprising a pair of annular ridges extending circumferentially around said cylindrical section for receiving said annular seal therebetween.

6. The drain valve as set forth in claim 5 wherein said stem retainer includes a projection which extends into said linear bore such that it selectively engages one of said annular ridges upon attempted withdrawal of said valve stem.

7. The drain valve as set forth in claim 1 wherein said biasing means comprises a spring segment included on said stem retainer having a gripping portion adjacent to the projection for enabling the spring segment to be flexed and the projection to be retracted from said linear bore.

8. The drain valve as set forth in claim 7 wherein said spring segment is disposed transverse to said linear bore.

9. The drain valve of claim 1 wherein said valve body, said valve stem and said stem retainer are made of a non-corroding material.

10. A valve comprising:

a valve body having an inlet bore, an outlet bore, and a valve stem receiving bore in fluid communication with each other, an annular seat disposed between the inlet and outlet bores and substantially transverse to the valve stem receiving bore;

a valve stem disposed in the valve stem receiving bore for longitudinal movement between an annular seat engaging position to prohibit the flow of fluid between the inlet and outlet bores and a position displaced from the annular seat to permit the flow of fluid between the inlet and outlet bores, the valve stem having a generally transverse surface disposed generally along its circumference; and a stem retainer mounted externally on the valve body, the stem retainer comprising a spring segment for urging a projection disposed thereon through an aperture in the valve body into the stem receiving bore for selectively engaging the transverse surface to limit the longitudinal movement of the valve stem said spring segment having a substantially arcuate conformation and said projection being elongated transverse to the stem receiving bore whereby flexure of the spring segment changes the characteristics of its arcuate conformation for enabling a part of the elongated projection to abut the exterior of the valve body, thus placing said stem retainer in a stable disable condition while remaining associated with the valve body.

11. The valve as set forth in claim 10 wherein the spring segment has a gripping portion to facilitate flexing the spring segment and withdrawing the projection from the stem receiving bore.

12. The valve as set forth in claim 11 wherein the spring segment is disposed transverse to the stem receiving bore.

13. The valve as set forth in claim 10 wherein the projection is disposed adjacent one end of the spring segment and a releasable connecting means for releasably connecting the spring segment and the valve body is disposed adjacent the other end.

14. The valve as set forth in claim 13 wherein the releasably connecting means comprises a second projection which is received in a second aperture in the valve body.

15. The valve as set forth in claim 14 wherein the transverse surface is disposed on an annular ridge extending circumferentially around the valve stem.

16. The valve of claim 10 wherein said valve body, said valve stem and said stem retainer are constructed of a thermoplastic material.

* * * * *